May 6, 1924.
R. SYKORA
VALVE
Filed Jan. 22, 1921
1,493,133
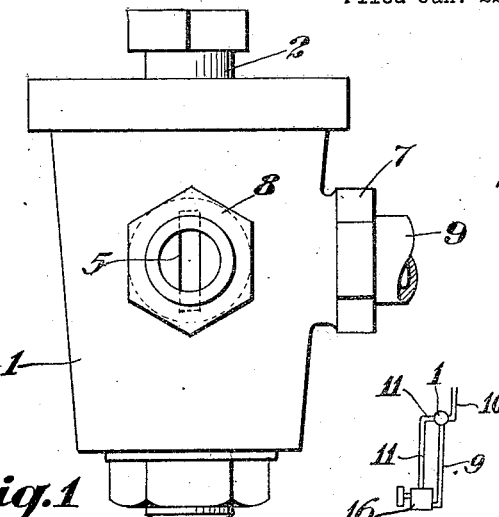
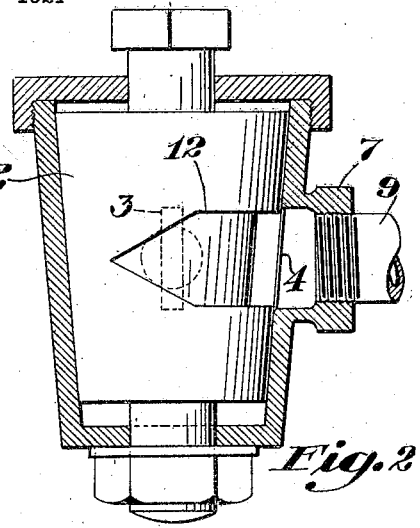
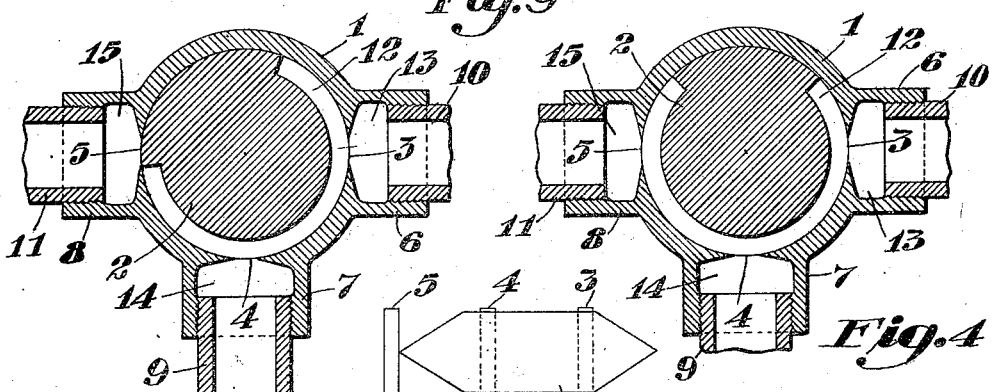
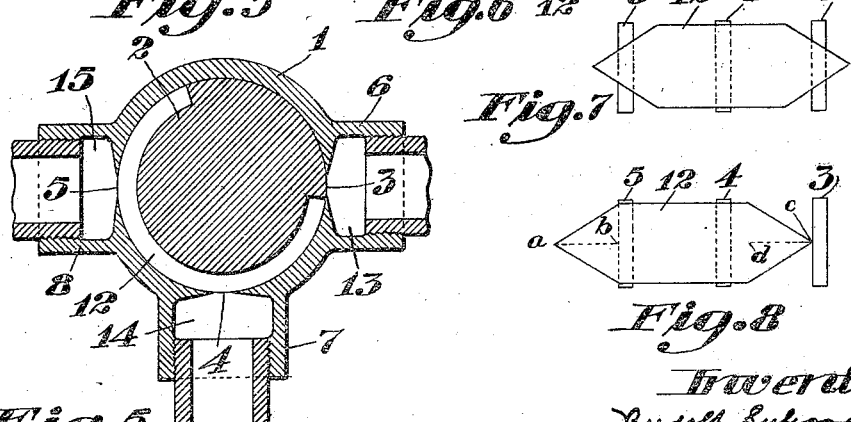

Patented May 6, 1924.

1,493,133

UNITED STATES PATENT OFFICE.

RUDOLF SYKORA, OF BOSTON, MASSACHUSETTS.

VALVE.

Original application filed February 11, 1920, Serial No. 357,778. Divided and this application filed January 22, 1921. Serial No. 439,252.

*To all whom it may concern:*

Be it known that I, RUDOLF SYKORA, a citizen of the United States, residing at Boston, county of Suffolk, Commonwealth of Massachusetts, have invented a certain new and useful Improvement in Valves, of which the following is a specification, reference being had therein to the accompanying drawings.

The invention relates to an improvement in three-way valves. This application is a division of an application for a coloring machine, filed by me February 11, 1920, Serial No. 357,778.

In the ordinary three-way valve, a hollow plug is used having slots in its wall to the interior of the plug, and the liquid from the inlet pipe has to pass through one of the slots into the chamber in the interior of the plug and thence out of said chamber in the plug through one or both of two other slots in the wall of the plug which lead to the outlet pipes. Also, as usually constructed, when the plug is turned to cut off one outlet and open the other, there is an interruption of the flow while the shift is being made.

One object of the invention is to produce a three-way valve in which a constant volume is maintained at the outlet or outlets independent of any variations in the effective area of either one of the outlets, this being accomplished by varying the area of the two outlets by equal inverse ratios.

In carrying out this object, I provide a three-way valve in which there is a continuous flow, constant in volume, and to provide means whereby the outflow may be entirely through either one or the other of the two outlets, and which may be divided at will so that the proportion which flows through either one of the outlets may be increased or diminished with relation to the outflow through the other outlet, the increase or diminution in one being in inverse ratio to the variation in the other, the total outflow being always the same and equal to the inflow and without interruption in the total outflow, regardless of the variation in the ratio between the two outlets.

In the preferred embodiment of the invention, there is combined with the valve casing a plug having an exterior segmental groove which communicates with the inlet pipe and with either one or both of the outlet pipes according to the position of the plug, so that the fluid flows in the segmental groove in the outer periphery of the plug. This facilitates the cleansing of the plug. Another feature of the invention relates to the form of the groove which is tapered at each end in such manner that the combined cross sectional area of the portions of the groove which at any one time connect with the outlet ports, shall be equal to the cross-sectional area of the inlet port, and when the plug is turned to vary the relative proportions of the discharge from the two outlets, the combined areas of the two discharge outlets will always be maintained the same, and the diminution in one will be exactly equal to the increase in the other.

The invention will be fully understood from the following description when taken in connection with the accompanying drawings, and the novel features will be pointed out and clearly defined in the claims at the close of this specification.

In the drawings, Fig. 1 is a side elevation of a valve embodying the invention.

Fig. 2 is a vertical sectional view of the valve shown in Fig. 1.

Figs. 3, 4 and 5 are horizontal sectional views showing the valve with the plug in three different positions, Fig. 3 showing it with the passage open from the inlet pipe to the right-hand outlet, and the passage to the left-hand outlet being entirely closed.

Fig. 4 shows both outlet passages open.

Fig. 5 shows the left-hand outlet open and the right-hand outlet closed.

Fig. 6 is a development showing the position of the grooved passage in the plug in relation to the inlet and outlet slots of the casing as in Fig. 3.

Fig. 7 is a development showing the relative positions as in Fig. 4.

Fig. 8 is a development showing the positions as in Fig. 5.

Fig. 9 is a diagrammatic view showing the application of the valve to use in a supply system.

Referring now to the drawings, 1 represents the valve casing and 2 the plug. The valve casing is formed with three ports 3, 4 and 5, preferably arranged 90° apart, the intermediate port 4 being an inlet port and the two ports 3 and 5 respectively, being the outlet ports.

The casing is formed with tubular bosses 6, 7, 8, which respectively have passages 13, 14, 15 connected with the said ports 3, 4, 5, and which are constructed for connection with the inlet pipe 9 and the outlet pipes 10—11.

The plug 2 is preferably tapered and is formed with a segmental groove 12 which extends somewhat more than halfway around the periphery, being of a sufficient length so that the plug may be adjusted in such position that the groove will connect with all three ports at the same time, as shown in Figure 4.

The ports 3, 4, 5 in the casing 1 are somewhat narrow elongated slots, as shown in Figures 6, 7, 8, the elongation being in the lengthwise direction of the casing, that is vertically elongated when the valve stands in vertical position as shown in Figures 1 and 2, while the groove 12 extends in a direction circumferentially of the periphery of the plug. The passages 13, 14, 15 respectively, formed in the bosses 6, 7, 8 are circular in cross section so as to permit the pipes 9, 10, 11 to be connected with said bosses, but the said passages 13, 14, 15 where they pass through the walls of the casing merge into the elongated slots 3, 4, 5 as already described. These slots 3, 4, 5 should preferably be all of the same size, and should be at least as long and preferably a little longer than the width of the groove 12, as will be seen by reference to Figures 2, 6, 7, 8. The cross sectional area of the bore of each of the pipes 9, 10, and 11 should be at least as great as the cross sectional area of each of the slots 3, 4, 5.

The depth of the groove 12 should be the same throughout its length, as will be seen by reference to Figures 3, 4 and 5. The groove should taper in width toward each end, as shown in Figures 6, 7 and 8, the taper being alike at each end, and the portion intermediate the two tapered portions should be of uniform width. Furthermore the combined length of the two tapered portions should be equal to the entire length of the intermediate untapered portion. Referring more particularly to Figures 6, 7 and 8, the taper at the left-hand end extends from $a$ to $b$, and at the right-hand end extends from $c$ to $d$, and the taper should be at a uniform angle. The distance from $a$ to $b$, plus the distance from $c$ to $d$, should be equal to the distance from $b$ to $d$. The distance from $a$ to $d$ and from $b$ to $c$ of the groove should each be equal to the distance from the slot 3 to the slot 5, measured from outside edge to outside edge, and the overall length of the groove should exceed the over-all distance between the slots 3 and 5 an amount equal to the length of either one of the tapered portions of the groove.

When the plug is in the position shown in Figure 3, the inlet slot 4 is uncovered and the outlet slot 3 is also uncovered, and both are open to the wide part of the groove 12, as shown in Figure 6, while the outlet slot 5 is entirely closed. In this position the full inlet flow from the pipe 3 will be carried out through the pipe 10.

When the plug is moved from the position shown in Figure 3 to the position shown in Figure 4, it will cause the groove 12 to connect with both outlet slots 3 and 5, as shown in Figure 7, so that the fluid will be divided and part pass out through each of the slots 3 and 5. When, however, the plug is in this position the tapered portions of the groove 12 respectively open into the outlet slots 3—5, and the cross sectional area of both of the said open portions of the tapered part of the groove which are in alignment with the two slots 3, 5, are together only equal to the cross sectional area of that portion of the wide part of the groove which is in alignment with the slot 3, when it was in the position of Figure 3, that is the cross sectional area of the open portion of the two outlets 3, 5, when in the position of Figure 4, is just equal to the cross sectional area of the open portion of the single outlet slot 3 when in position of Figure 3. When the plug is moved around into the position shown in Figure 5, it closes entirely the outlet 3 and opens the outlet 5, so that the entire discharge goes through the outlet 5 while the outlet 3 is closed. At this time the slot 5 is entirely uncovered and the slot 3 is entirely covered, as shown in Figures 5 and 8.

It will be obvious that by turning the plug to an intermediate position between Figures 3 and 4, or between Figures 4 and 5, the inlet slot 4 will still remain uncovered and both the slots 3 and 5 will be open to the tapered portions of the groove 12, and therefore partly covered, as shown in Figure 7. If the position be such that the slot 3 is open to the groove 12 at one-third of the distance from $c$ to $d$, then the slot 5 will be open to said groove at two-thirds the distance from $a$ to $b$. Therefore, the cross sectional area of the passage through the port 5 will be twice as great as that through the port 3, and thus there will be twice as much carried out through the port 5 as through the port 3, but the total area of the uncovered portion of the slots 3, 5 will be equal to the area of the inlet slot 4.

Thus the proportions of the discharge through the ports 5 and 3 may be varied to any ratio desired by moving the plug to the proper position, but the sum of the two outlet areas will always be equal to the inlet area.

While in the drawings I have shown the two outlet ports as being diametrically opposite each other, this is not essential.

This valve is particularly adaptable for connection with supply systems, affording constant hydraulic pressure within its pipe system and its center of propulsion, the pump. One application of this feature of the invention is shown and described more in detail in my application for patent for coloring machine, Serial No. 357,778, previously referred to, the arrangement of the valve and the pump with the return pipe being shown as coming from one of the outlets of the valve and tapped into the inlet of the pump. The rotation of the pump and the quantity of flow actuated by it is constant. The quantity of liquid at one of the outlets of the valve varies according to the necessity of the required quantity for treatment. If the quantity through this outlet is decreased by turning the plug of the valve in connection with the constant rotation of the pump, and if there is no return, an increase of hydraulic pressure will occur with the result of an increase of flow through a narrower space. It is evident, therefore, that with such an arrangement of a return circuit, the quantity of liquid not being allowed to pass through the one outlet will pass through the other outlet and through the return circuit into the inlet to the pump without suffering any waste on the part of the liquid, thereby acting so to speak as a safety valve to avoid an increase of hydraulic pressure. Without the return circuit, not only would the hydraulic pressure increase but also there will be an increase of flow of liquid through a narrower space with a perceptible increase of friction and a decrease of rotation of the pump.

In the diagram shown in Figure 9, which illustrates a part of the device shown in the said application, Serial No. 357,778, a pump 16 is shown as supplying the liquid to the valve 1 through the inlet pipe 9. The outlet pipe 11 from the valve leads back to the inlet to the pump. The outlet pipe 10 may lead to any point where it is desired to deposit the liquid.

What I claim is:—

1. A valve comprising a casing having an inlet port and two outlet ports, the inlet port being intermediate the two outlet ports and at equal distances therefrom, in combination with a rotary plug having a segmental groove in its periphery tapered alike at each end, the said grooves being of uniform width between the two tapered end portions, the two tapered end portions being tapered in the direction toward the ends by a uniform angle of taper throughout the length of the tapered portion.

2. A valve comprising a casing having an inlet port and two outlet ports, the inlet port being intermediate the two outlet ports and at equal distances therefrom, in combination with a rotary plug having a segmental groove in its periphery tapered alike at each end, the said groove being of uniform width between the two tapered end portions, said tapered portions being each of a length equal to one-half of the length of the untapered intermediate portions and tapering in the direction toward the ends by a uniform angle of taper throughout the length of the tapered portion to a sharp pointed end, the combined length of the untapered portion and of either one of the tapered portions being equal to the distance between the further edge of either one of the outlet ports and the most remote edge of the inlet port.

3. A valve comprising a casing having an inlet port and two outlet ports, the inlet port being intermediate the two outlet ports and at equal distances therefrom, in combination with a rotary plug having a segmental groove in its periphery tapered alike toward each end, the angle of taper being uniform throughout the tapered portion, the said groove being of uniform width between the two tapered portions, the said two tapered portions being each of one-half the length of the untapered intermediate portion, the combined length of the untapered portion and of either one of the tapered portions being equal to the distance between the farther edge of either one of the outlet ports and the most remote edge of the inlet port, the increase or diminution of the effective area of discharge through either outlet caused by the adjustment of the plug being by equal gradations for each degree of rotation of the plug in inverse ratio to the extent of variation in the effective area of discharge through the other outlet.

4. A three-way valve comprising a casing having two outlet ports and an inlet port intermediate said outlet ports, in combination with a plug having a segmental groove in its periphery, said groove having a middle portion of uniform width which merges into tapered end portions of uniform angle of taper to the ends of the groove, said plug being adjustable so that the inlet port and either one or both of the outlet ports, as desired, may register with said groove, the increase or diminution of the effective area of discharge through either outlet port caused by the adjustment of the plug being by equal gradations for each degree of rotation of the plug in inverse ratio to the extent of variation in the effective area of discharge through the other outlet.

5. A three-way valve comprising a casing having two outlet ports and an inlet port intermediate said outlet ports, in combination with a plug having a segmental groove in its periphery, the ends of said groove being tapered, said plug being adjustable so that the inlet port and either one or both of the outlet ports, as desired, may register with said groove, the increase or diminution of the effective area of discharge through either outlet port caused by the adjustment of the plug being in inverse ratio to the extent of variation in the effective area of discharge through the other outlet, the inlet port and either one or both of the outlet ports being always open, so that there is a continuous flow, the total area of effective discharge capacity being always the same regardless of the variation in the ratio between the two outlets.

6. A three-way valve comprising a casing having two outlet ports, and an inlet port intermediate said outlet ports, in combination with a plug having a passage which is adapted to communicate at will with either one or both of said outlet ports according to the adjustment of the plug, said passage in the plug being so constructed that the plug may be adjusted to increaes or diminish the effective area of discharge through either one of the outlets, and to thereby vary in inverse ratio the effective area of discharge through the other outlet, the total outflow through both outlets being always the same regardless of the variation in the ratio of the effective area of discharge of the two outlets.

7. A three-way valve having an inlet and having two outlets which maintain a constant effective total area of discharge regardless of the variation of the area of either one of the outlets.

8. A three-way valve having an inlet and having two outlets in which any variation in the effective area of discharge of either one of the outlets is accompanied by an equal inverse variation in the effective area of discharge of the other outlet.

9. A valve comprising a casing having an inlet and two outlet ports, the inlet port being intermediate the two outlet ports and at equal distances therefrom, said ports all being of narrow rectangular form of equal size and elongated in a direction longitudinally of the casing, in combination with a rotary plug having a segmental groove in its periphery tapered alike at each end, the said groove being of uniform width between the two tapered portions, the longitudinal dimension of each of the ports being in the transverse direction of the said groove and being at least as great as the width of the wider portion of said groove, the side edges of said ports being at right angles to the parallel sides of said groove.

10. A valve comprising a casing having an inlet and two outlet ports, the inlet port being intermediate the two outlet ports and at equal distances therefrom, said ports all being of narrow rectangular form of equal size and elongated in a direction longitudinally of the casing, in combination with a rotary plug having a segmental groove in its periphery tapered alike at each end, the said groove being of uniform width between the two tapered portions, the longitudinal dimension of each of the ports being in the transverse direction of the said groove and being at least as great as the width of the wider portion of said groove, the side edges of said ports being at right angles to the parallel sides of side groove, the effective area of discharge through either outlet being increased or diminished by equal gradation for each degree of rotation of the plug.

11. A valve comprising a casing having an inlet and two outlet ports, the inlet port being intermediate the two outlet ports and at equal distances therefrom, said ports all being of narrow rectangular form elongated in a direction longitudinally of the casing and of equal cross sectional area, in combination with a rotary plug having a segmental groove in its periphery tapered alike at each end, the tapered portion having a uniform angle of taper throughout, the said groove being of uniform width between the two tapered portions, the longitudinal dimension of each of the ports being at least as great as the wider portion of the groove, said ports intersecting said groove at right angles to the parallel sides of the groove.

12. A valve comprising a casing having an inlet and two outlet ports, the inlet port being intermediate the two outlet ports and at equal distances therefrom, said ports all being of narrow rectangular form of equal size, in combination with a rotary plug having a segmental groove in its periphery tapered alike at each end, the said groove being of uniform width between the two tapered portions, the side edges of said ports being at right angles to the parallel sides of said groove, the longitudinal dimension of each of the ports being at least as great as the width of the wider portion of said groove, the relative positions of said inlet and outlet ports and segmental groove in the plug being such that when either one of the outlet ports begins to cut across the narrowest part of the said groove the other outlet port will begin to cut across the widest part of said groove.

13. A valve comprising a casing having an inlet and two outlet ports, the inlet port being intermediate the two outlet ports and at equal distances therefrom, said ports all being of narrow rectangular form of equal size and elongated in a direction longitudinally of the casing, in combination with a rotary plug having a segmental groove in its periphery tapered alike at each end, the said groove being of uniform width between the two tapered portions, the longitudinal dimension of each of the ports being in the transverse direction of the said groove and at least as great as the width of the wider portion of said groove, the side edges of said ports being at right angles to the parallel sides of said groove, in combination with a pump having an outlet pipe therefrom which connects with the inlet port of the valve and supplies fluid to the valve, a pipe which connects one of the outlet ports of the valve back to the pump, and a pipe leading from the other outlet port of the valve to the desired point of supply.

In testimony whereof I affix my signature.

RUDOLF SYKORA.